Jan. 14, 1930. M. PONCELET 1,743,389
ANIMAL TRAP
Filed May 28, 1928 2 Sheets-Sheet 1
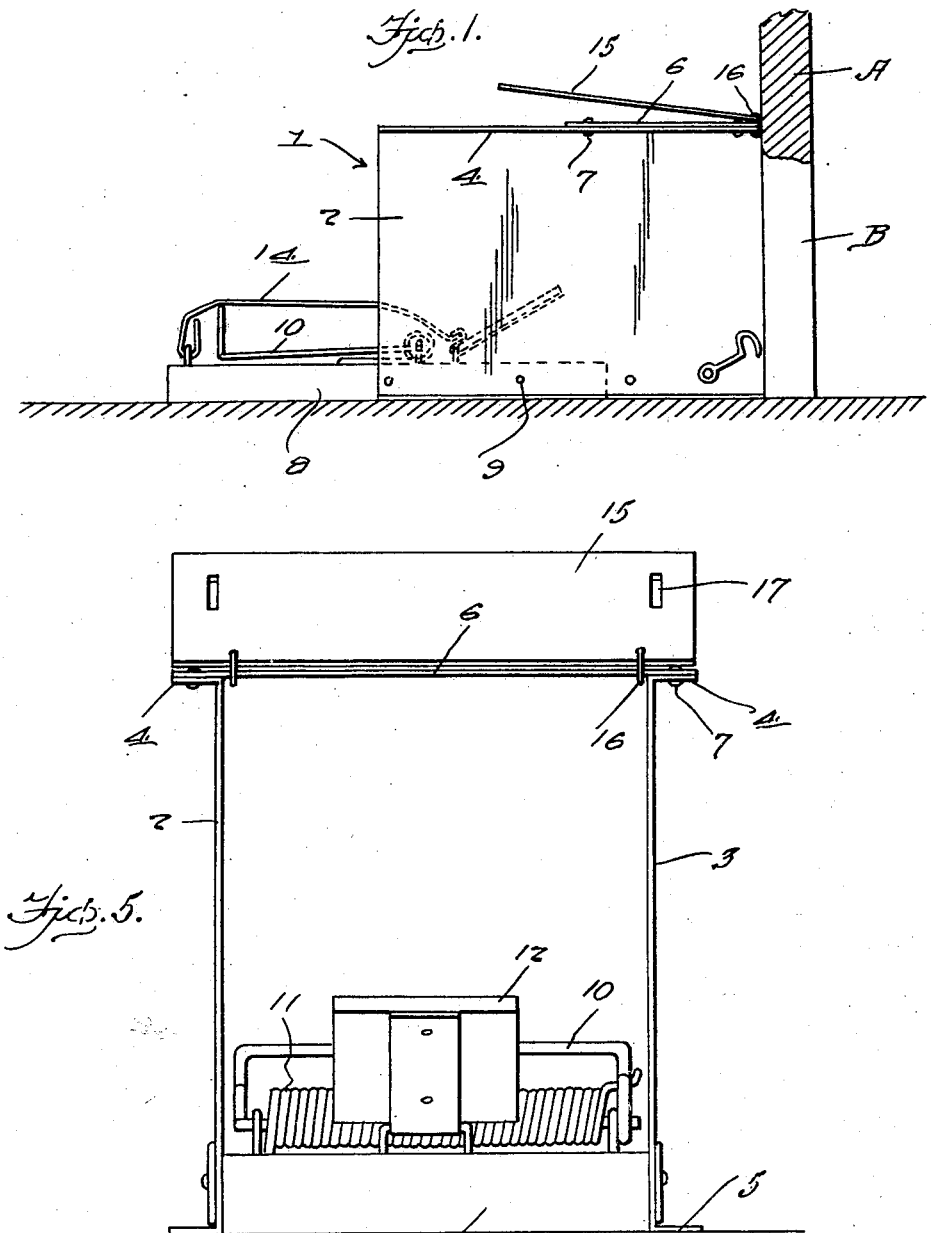
Inventor
M. Poncelet
By Clarence A. O'Brien
Attorney Jan. 14, 1930.　　　M. PONCELET　　　1,743,389
ANIMAL TRAP
Filed May 28, 1928　　2 Sheets-Sheet 2
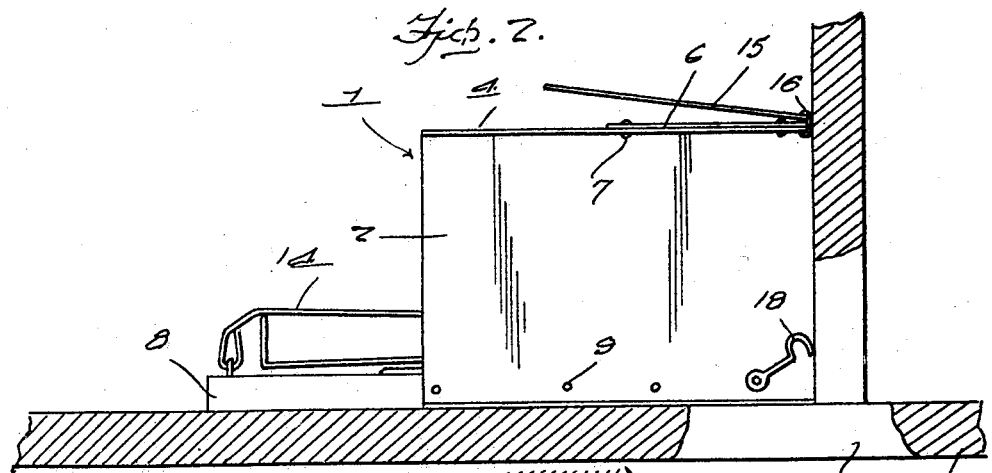
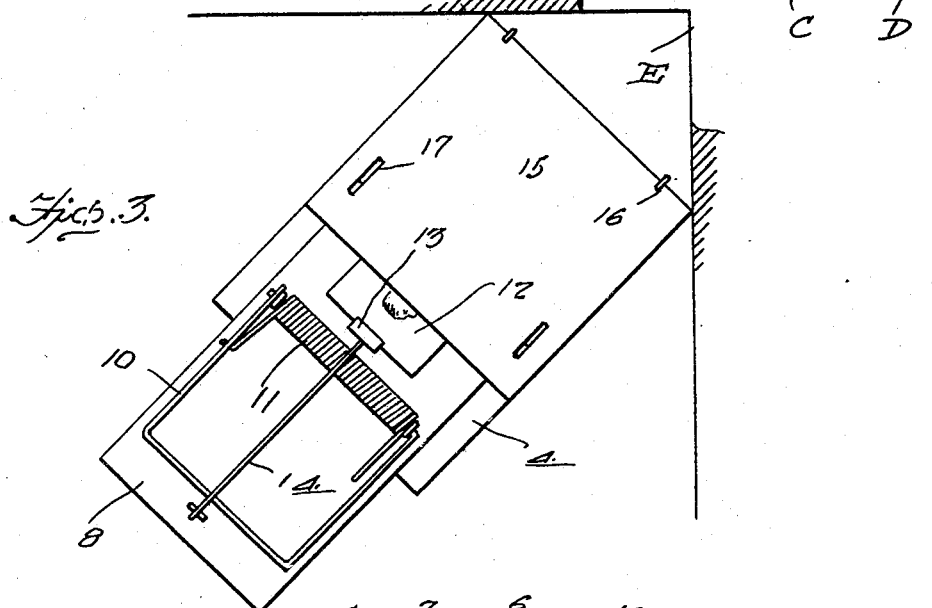
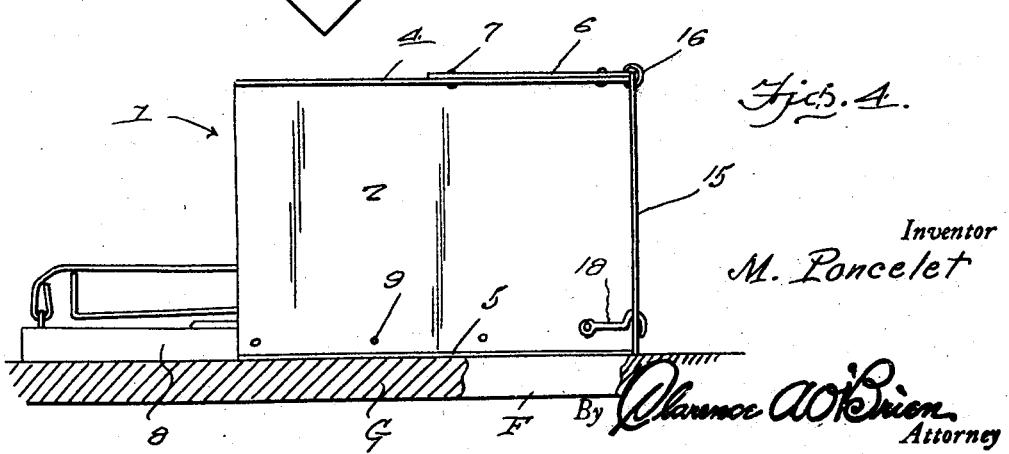
Inventor
M. Poncelet
By Clarence A. O'Brien
Attorney Patented Jan. 14, 1930

1,743,389

UNITED STATES PATENT OFFICE

MATHIAS PONCELET, OF PINE ISLAND TOWNSHIP, GOODHUE COUNTY, MINNESOTA

ANIMAL TRAP

Application filed May 28, 1928. Serial No. 281,276.

The present invention relates to improvements in animal traps and has reference more particularly to a rat trap that includes a housing having end and bottom ingress openings whereby the trap may be positioned over a hole in the floor, or against a wall formed with a rat hole in its side, or in a corner where the rat hole is located, a swinging closure being provided for the ingress end of the housing when the trap is placed over a hole formed in the floor, so that the rat must pass through the housing where it is caught, the closure being swung upwardly to an open position when the trap is positioned against a wall or in a corner.

A further object is to provide an animal trap which is simple in construction, inexpensive, strong and durable, and further well adapted to the purpose for which it is designed.

Other objects of the invention will become apparent as the nature of the invention proceeds and when taken in connection with the accompanying drawings.

In the accompanying drawings forming a part of this application and in which like numerals designate like parts throughout the several views.

Figure 1 is a side elevation of the rat trap showing the same in position against a wall, with the door swung upwardly to an open position and the trap set.

Figure 2 is a similar view, showing the rat hole formed in the side wall, as well as in the floor at the juncture of the floor with the side wall.

Figure 3 is a top plan view showing the position of the trap when placed in a corner where a rat hole is located.

Figure 4 is an elevational view showing the position of the trap located over a hole formed in the floor, the closure being secured in its lowered closed position, and Figure 5 is a front end elevation of the trap, the door being shown in an upwardly swung and open position.

In the drawings, wherein for the purpose of illustration is shown the preferred embodiment of my invention, the numeral 1 designates generally the housing of the rat trap, the same comprising a pair of parallel spaced vertical side walls 2 and 3 respectively, formed of any suitable metal. The upper edges of the side walls are bent outwardly as at 4, and the lower edges of the side walls are also bent outwardly as at 5. A plate 6 extends across the laterally disposed flanges 4 at the forward end portion of the housing, and any appropriate fastening means extends through the side edges of the plate and the respective flanges as shown at 7 in the drawings. The side walls 2 and 3 are further secured together in parallel spaced relation by the forward end portion of the rectangular wooden base 8.

The base 8 is adapted to rest on the floor and lie flush with the bottom faces of the lower flanges 5 and suitable fastening means 9 extend through the lower edge portions of the side walls and into the adjacent side edges of the base 8.

The vertically swinging jaw that is pivotally mounted on the base 8 is designated by the numeral 10 and the spring which actuates the jaw is shown at 11. The pivoted treadle 12 is relatively wide and is mounted forwardly of the pivotal connection between the jaw and the base. A lip 13 is arranged on the rear edge of the intermediate portion of the pivoted treadle 12 and pivotally secured on the rear end portion of the base 8 is the lever 14, the same extending over the spring actuated jaw 10 and engaging the lip 13, whereby the jaw 10 is held in a set position. The bait is placed on the treadle in the usual manner, and when the parts are arranged as shown in the drawings, the jaw 10 is set so that when the animal touches the treadle 12, the lip 13 will be disengaged from the rear end of the pivoted lever 14 and the spring 11 will automatically swing the jaw 10 into a position whereby it will strike the animal and hold the animal on the base against escape.

As this type of trap is well known in the art, no claim is made thereto apart from the housing which is the salient feature of the present invention.

The housing will be provided with a forward end and bottom ingress opening, and a pivoted door 15 is hingedly secured at its upper edge to the forward edge of the top plate 6, as at 16.

The door 15 is wider than the space between the side walls 2 and 3 of the housing and formed in the lower edge portion of the door inwardly of the respective side edges thereof are the slots 17, with which cooperate the pivoted hooks 18, arranged on the outer faces of the respective side walls.

When the trap is set in the position shown in Figure 1, the door 15 is swung upwardly and rearwardly over the top plate 6, so that the forward edges of the side walls abut against the side wall A in which is formed the rat hole B, so that the open forward end of the housing forms an ingress opening, and when the trap is set, the rat upon entering the housing and stepping upon the treadle 12 will cause the trap to be sprung and be caught.

In Figure 2, the trap is shown as being positioned against the side wall of a room that is formed with a rat hole, and also over a rat hole C, formed in the floor D, whereupon, both the forward end and the open bottom of the housing provide ingress openings, so that a rat entering through either rat hole will be able to reach the set trap.

In Figure 3, I have shown the trap positioned in a corner of a room where the rat hole E is located and the rat will enter the trap through the opposed opening when the door 15 is swung upwardly and is disposed over the top plate 6.

In Figure 4, the trap is shown with the housing positioned over a rat hole F formed in the floor G, and when in this position, the door 15 is swung downwardly to close the forward ingress opening and the hooks 18 engage with the slotted portions of the door to secure the same in its closed position. The bottom ingress opening will be positioned directly over the rat hole F, so that the rat must step upon the treadle in order to escape through the open rear end of the housing, whereupon the trap which has been initially set will be sprung and the animal will be caught.

It will thus be seen from the foregoing description that I have provided an animal trap and a housing for association therewith that is very simple in construction and therefore inexpensive in its manufacture, yet strong and durable. A trap of this character may not only be used in catching rats but may be used for catching other animals in an equally efficient manner.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

In combination, a rat trap, a housing including spaced side walls, outwardly extending flanges formed on the upper edges of said side walls, the lower edge portions of the side walls being secured to the respective sides of the trap, the housing being provided with a bottom ingress opening at the forward end, a top plate extending across the flanges at the forward end portion of the housing, the forward end of the housing providing an ingress opening, a closure for the open forward end of the housing hingedly secured at its upper edge to the forward edge of the top plate, the closure being of a width greater than the distance between the spaced side walls, the edge portions of the hinged closure being formed with slots, and hooks pivoted on the outer face of the side walls adjacent the forward ends thereof for engagement with the respective slots to secure the closure in a lowered position over the ingress opening at the forward end of the housing.

In testimony whereof I affix my signature.

MATHIAS PONCELET.